United States Patent [19]
Graves et al.

[11] 3,932,772
[45] Jan. 13, 1976

[54] HIGH VOLTAGE SWITCHING GENERATOR

[75] Inventors: Paul W. Graves, Marlborough;
Constantine Rhodes, Sudbury, both of Mass.

[73] Assignee: GTE Sylvania Incorporated, Stamford, Conn.

[22] Filed: Sept. 27, 1974

[21] Appl. No.: 509,856

[52] U.S. Cl. ............... 307/264; 307/254; 307/227; 307/268
[51] Int. Cl.² ......................................... H03K 1/14
[58] Field of Search ........... 307/254, 264, 268, 227, 307/296, 318, 246

[56] References Cited
UNITED STATES PATENTS
3,056,891   10/1962   Kabell............................ 307/318 X

*Primary Examiner*—John Zazworsky
*Attorney, Agent, or Firm*—David M. Keay; Elmer J. Nealon; Norman J. O'Malley

[57] ABSTRACT

A high voltage switching generator for rapidly changing the voltage across a load capacitance. A first DC voltage source connected in series with non-linear device and switch units together with a second DC voltage source is connected across the load capacitance. Each non-linear device and switch unit includes a series of zener diodes providing a non-linear device having a threshold voltage equal to the sum of the threshold voltages of the individual diodes. During current flow therethrough the series of zener diodes has a voltage drop equal to its threshold voltage. Each non-linear device and switch unit includes a transistor by-pass switching arrangement which can be closed to short circuit the associated series of zener diodes so that there is no voltage drop thereacross. By selectively opening and closing the by-pass switching arrangements of the non-linear device and switch units the voltage across the load capacitance can be changed.

7 Claims, 4 Drawing Figures

HIGH VOLTAGE SWITCHING GENERATOR

BACKGROUND OF THE INVENTION

This invention relates to high voltage switching apparatus. More particularly, it is concerned with apparatus for switching rapidly between selected high voltage levels.

Beam penetration cathode ray tubes are well known for use in electronic information displays in order to provide multi-colored display of data. Typically these devices utilize two different phosphors and produce particular colors depending upon the anode voltages employed to accelerate the electron beam which strikes the phosphors. In a typical example the accelerating anode voltages for a four color beam penetration cathode ray tube are 12 kilovolts for yellowish-green, 10 kilovolts for yellow, 8 kilovolts for orange, and 6 kilovolts for red.

The accelerating voltage is obtained by charging and maintaining the charge across a capacitance. It is desirable that apparatus for changing the voltage across the capacitance operate quickly and be capable of operating at a high repetition rate. For example, the electron beam repositioning time of a cathode ray tube typically may be from 5 to 15 microseconds. It is desirable to be able to change voltage levels within this period of time and also to be able to change voltage levels frequently.

Various types of high voltage generators for switching high voltages have been employed in the operation of beam penetration cathode ray tubes. Vacuum tube type apparatus have been used satisfactorily in certain applications, but have the typical disadvantages of vacuum tubes of limited life, high power consumption, and size. Solid state high voltage switching generators heretofore available have been limited to relatively slow switching speeds. The difficulties of withstanding the high voltages employed and of handling the power requirements at the desired switching speeds and frequency have not been satisfactorily overcome with previously available solid state apparatus.

SUMMARY OF THE INVENTION

Voltage switching apparatus which permits rapid changes of high voltages in accordance with the present invention includes a pair of input terminals and a pair of output terminals. A source of DC voltage is connected between the input terminals and a load capacitance means is connected between the output terminals. A non-linear means is connected in series between one of the input terminals and one of the output terminals. The non-linear means has a current-voltage characteristic with a threshold voltage below which its conductance is low and above which its conductance increases steeply. Zener diodes are well known solid state devices having such a characteristic. A switch means is connected in parallel with the non-linear means. A switch driving means produces energizing pulses, and a control means selectively applies energizing pulses from the switch driving means to the switch means.

When energizing pulses from the switch driving means are applied to the switch means, the non-linear means is short-circuited. This action causes the voltage across the load capacitance means to be increased by an amount equal to the threshold voltage of the non-linear means. When energizing pulses are not being applied to the switch means, the switch means provides an open circuit across the non-linear means. In this situation the voltage across the load capacitance means is decreased by an amount equal to the threshold voltage of the non-linear means.

BRIEF DESCRIPTION OF THE DRAWINGS

Additional objects, features, and advantages of high voltage switching apparatus in accordance with the present invention will be apparent from the following detailed discussion together with the accompanying drawings wherein.

DETAILED DESCRIPTION OF THE INVENTION

Figure 1:
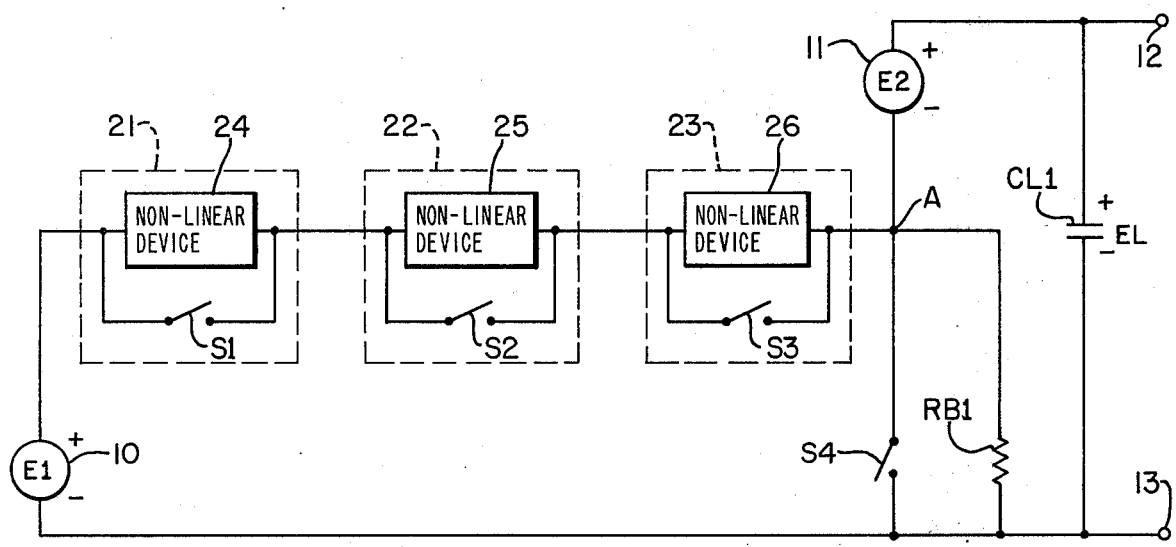
FIG. 1 is a simplified representation of a high voltage switching generator for explaining the principles involved in the present invention.

FIG. 1 is a representation of a high voltage switching generator utilizing the principles of the present invention. The apparatus includes a first high voltage DC source 10 having an output voltage E1, for example, of 6 kilovolts. A second DC source of high voltage 11 produces an output voltage E2, also of 6 kilovolts, for example. The E2 voltage source 11 is connected between one terminal 12 of output terminals 12 and 13 and an intermediate point labelled A. A load capacitance CL1 is connected across the output terminals 12 and 13 and an output voltage EL appears across the capacitance. The negative terminal of the E1 voltage source 10 is connected to the other output terminal 13.

Connected in series between the positive terminal of the E1 voltage source 10 and point A are three units 21, 22, and 23. Each of the three units 21, 22, and 23 includes a non-linear device 24, 25, and 26, respectively, connected in series, and a by-pass switch S1, S2, and S3, respectively, connected in parallel with its associated non-linear device. A fourth switch S4 is connected between intermediate point A and output terminal 13. A bleeder resistor RB1 is also connected between point A and output terminal 13.

Figure 2:
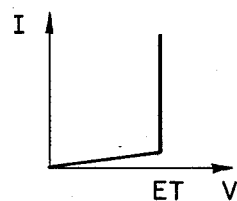
FIG. 2 is a current-voltage characteristic curve of non-linear devices which are employed in the apparatus of the invention.

The non-linear devices 24, 25, and 26 each have a current-voltage characteristic such that their conductance is low until a threshold voltage ET is reached. Above the threshold voltage conductance increases very steeply. This characteristic is illustrated by the current-voltage curve of FIG. 2. In the apparatus of FIG. 1 the bleeder resistor RB1 is provided to draw the bias current necessary to establish the threshold voltage ET across the non-linear devices during operation of the apparatus.

For purposes of discussion it is assumed that the threshold voltage ET of each of the non-linear devices 24, 25, and 26 is 2 kilovolts so that the total of the threshold voltages in series is 6 kilovolts, the same as the output voltage of the E1 voltage source 10. A summary of the operation of the apparatus of FIG. 1 as controlled by switches S1, S2, and S3 is illustrated by the accompanying table.

| Switches | | | Voltage | Output |
| S1 | S2 | S3 | at A | Voltage (EL) |
| --- | --- | --- | --- | --- |
| OPEN | OPEN | OPEN | 0 | 6KV(E2) |
| OPEN | OPEN | CLOSED | 2KV $(\frac{E1}{3})$ | 8KV $(\frac{E1}{3}+E2)$ |
| OPEN | CLOSED | CLOSED | 4KV $(\frac{2E1}{3})$ | 10KV $(\frac{2E1}{3}+E2)$ |
| CLOSED | CLOSED | CLOSED | 6KV(E1) | 12KV(E1+E2) |

When all of the series switches S1, S2, and S3, are open a voltage drop equivalent to its threshold voltage ET of 2 kilovolts occurs across each of the non-linear devices 24, 25, and 26. The resulting voltage at point A is zero. The output voltage EL across the load capacitance CL1 between the output terminals 12 and 13 is equal to the voltage at point A plus E2, that is, E2 (6 kilovolts). Under these operating conditions the shunt switch S4 is closed to prevent a voltage rise at point A due to leakage current flowing through the non-linear devices 24, 25, and 26.

When one of the by-pass switches, for example S3, is closed and switch S4 is opened, current flows through non-linear devices 24 and 25, around non-linear device 26, and through the bleeder resistor RB1. The voltage drop between the positive terminal of the E1 voltage source 10 and point A is thereby reduced by 2 kilovolts (the threshold voltage ET of non-linear device 26), and thus the voltage at point A is increased by 2 kilovolts (E1/3). The resulting output voltage EL across the load capacitance CL1 is 8 kilovolts (E1/3+E2). The table shows the voltage obtained at point A and the resulting output voltage EL as determined by the conditions of by-pass switches S1, S2, and S3 so as to selectively provide output voltage EL of 6, 8, 10, or 12 kilovolts.

Figure 3:
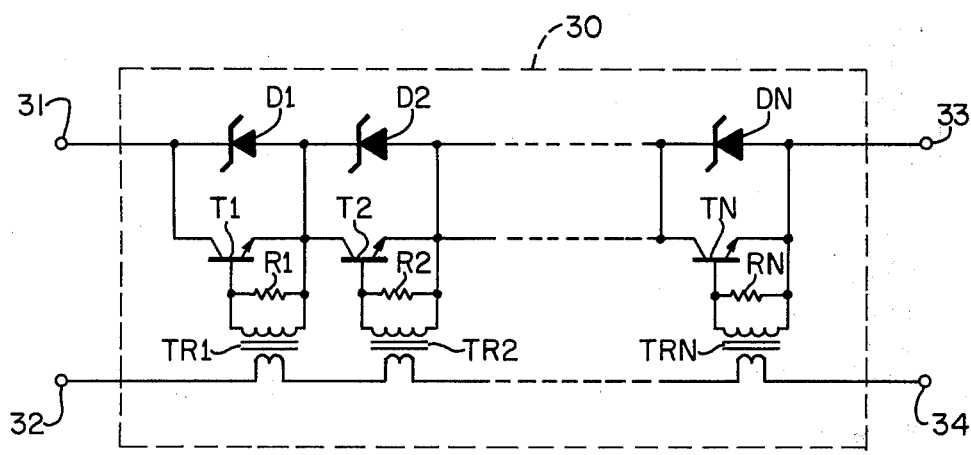
FIG. 3 is a circuit diagram of a unit including a non-linear device and by-pass transistor switch which is employed in the apparatus of the invention.

FIG. 3 is a circuit diagram of a unit 30 in accordance with the present invention which provides the combination of a high voltage non-linear device and a by-pass switch equivalent to each of the units 21, 22, and 23 of FIG. 1. A high voltage non-linear device is provided between device terminals 31 and 33 by a stack or series of non-linear elements, specifically zener diodes, D1 through DN. Each of the zener diodes has a current-voltage characteristic of the same form as the curve of FIG. 2. The characteristic of the series of zener diodes D1 through DN is also of similar form with the threshold voltage ET of the series being equal to the total of the threshold voltage ET of the individual diodes of the series. The number (N) of diodes in the series is determined by the threshold voltage ET of each of the diodes and the threshold voltage ET desired for the entire unit between the device terminals 31 and 33.

A by-pass switch in parallel with the series of zener diodes D1 through DN is provided by a series of individual switching elements employing NPN switching transistors T1 through TN. The relationship of the number of diodes to the number of switching transistors depends upon the threshold voltage of each diode and the voltage that each transistor can withstand. In the embodiment shown, each zener diode is connected in parallel with a transistor between the collector and the emitter of the transistor. The emitter of each transistor in the series of transistors is connected to the collector of the next transistor in the series. Each transistor T1 through TN has a biasing arrangement including a resistor R1 through RN, respectively, connected between the base and emitter of the associated transistor. The secondary winding of a transformer TR1 through TRN is also connected between the base and emitter of each transistor T1 through TN, respectively. The primary windings of the transformers are connected in series between switch control terminals 32 and 34. Thus, each zener diode and its associated switching transistor together with its biasing arrangement is an isolated independent switching element.

In the absence of energizing signals being applied to the primary windings of the transformers TR1 through TRN by way of terminals 32 and 34, the transistors T1 through TN are normally biased in a non-conducting condition. With the transistors T1 through TN non-conducting, the by-pass switch formed by them is, in effect, open. The series of zener diodes D1 through DN can then provide a voltage drop thereacross equal to the total of the threshold voltages ET of all the diodes as long as the proper biasing current is allowed to pass therethrough between the device terminals 31 and 33.

The by-pass switch is, in effect, closed by biasing all the transistors T1 through TN to conduction thus providing a short circuit around each associated diode D1 through DN, respectively. The transistors are biased to conduction by a suitable energizing current passing through the primary windings of the transformers TR1 through TRN between the switch control terminals 32 and 34. The energizing signal may be a squarewave or other alternating signal. Although the transistors are non-conducting during the negative half cycles, because of the low impedance charging path and high impedance discharge path of the load capacitance, the by-pass switch in parallel with the diodes can be considered as being closed by the application of an alternating signal to the switch control terminals 32 and 34.

Figure 4:
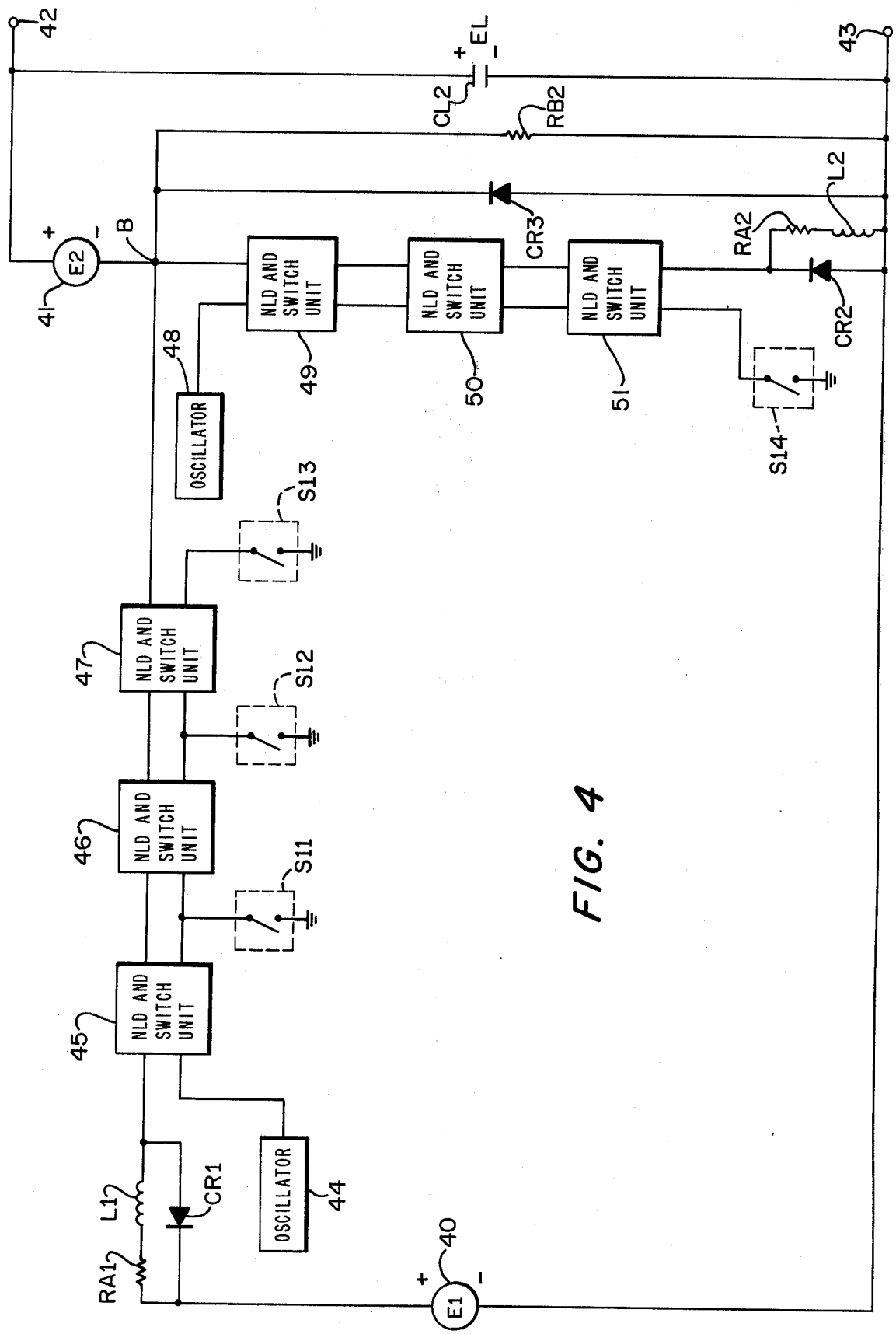
FIG. 4 is a diagram showing a high voltage switching generator in accordance with the present invention which employs the non-linear device and switch unit of FIG. 3 and is particularly suitable for use with beam penetration cathode ray tubes.

FIG. 4 illustrates a high voltage switching generator in accordance with the present invention employing the non-linear device and switch units illustrated in FIG. 3. The apparatus is particularly useful for supplying accelerating anode voltages of 6, 8, 10, or 12 kilovolts to a beam penetration cathode ray tube. The apparatus includes a first high voltage DC source 40 producing an output voltage E1 of 6 kilovolts and a second high voltage DC source 41 producing an output voltage E2 of 6 kilovolts. The output voltage EL of 6, 8, 10, or 12 kilovolts is produced across a load capacitance CL2 connected between output terminals 42 and 43.

The non-linear device terminals of three non-linear device and switch units 45, 46, and 47 are connected in series between the positive terminal of the E1 voltage source 40 and point B at the negative terminal of the E2 voltage source 41. For purposes of discussion of a specific embodiment, the threshold voltage ET of the series of zener diodes of each unit 45, 46, and 47 is 2 kilovolts. The positive terminal of the E1 voltage source 40 is connected to the device terminal of the unit 45 through a series resistor RA1 and inductor L1 in parallel with a diode CR1.

The switch control terminals of the non-linear device and switch units 45, 46, and 47 are also connected in series. An energizing source, for example, an oscillator 44 producing a squarewave output at 100 kilohertz, is connected to one of the switch control terminals of unit 45. A control arrangement for applying an energizing signal from the oscillator 44 to one, two, or three of the units is represented symbolically by switches S11, S12, and S13 which are, in effect, connected between the switch control terminals and ground. If switch S13 is closed, the by-pass switches in all three units 45, 46, and 47 are closed. If switch S12 is closed, the by-pass switches in units 45 and 46 are closed and the by-pass switch in unit 47 is open. If switch S11 is closed, the by-pass switch in unit 45 is closed and the by-pass switches in units 46 and 47 are open. If all the switches S11, S12 and S13 are open, the by-pass switches in all units 45, 46, and 47 are open.

Three non-linear device and switch units 49, 50 and 51 are connected in shunt between point B and output terminal 43. The non-linear devices of these units are connected in series between point B and output terminal 43. The total threshold voltage of the three shunt units is slightly greater than the total theshold voltage of the three series units 45, 46, and 47. A resistor RA2 and an inductor L2 in parallel with a diode CR2 are connected in series with the units 49, 50, and 51. The switch control terminals of units 49, 50 and 51 are connected in series between an oscillator 48 which produces an alternating signal and a control arrangement indicated symbolically by switch S14 to ground.

A bleeder resistor RB2 is also connected between point B and output terminal 43. A diode CR3 is connected between point B and output terminal 43 to provide short circuit protection for the units 49, 50, and 51.

The apparatus of FIG. 4 operates as follows to increase the voltage across the output terminals 42 and 43 assuming that the starting voltage is 6 kilovolts as established by the E2 voltage supply 41. Under these conditions the switches S11, S12 and S13 are all open so that the by-pass switches in each of units 45, 46, and 47 are open and a total voltage drop of 6 kilovolts (the output voltage of the E1 voltage source 40) occurs across the three units 45, 46, and 47 together. Switch S14 is closed so that oscillator 48 provides alternating signals to the primary windings of the switch transformers in units 49, 50, and 51 short circuiting the zener diodes stacks therein and causing the voltage at point B to be the same as at the output terminal 43.

When the output voltage between output terminals 42 and 43 is to be increased, switch S14 is opened and one of switches S11, S12, or S13 is closed permitting the output of oscillator 44 to close the by-pass switches of unit 45, of units 45 and 46, or of units 45, 46, and 47, respectively. When the by-pass switch in one or more of the units 45, 46, and 47 is closed, a higher voltage is present at point B and the sum of the voltage at point B and the 6 kilovolts from the E2 power supply 41 is applied across the capacitance CL2 raising the output voltage EL to the desired level. The biasing arrangements of the switching transistors T1 through TN as illustrated in FIG. 3 bias the transistors to produce a short circuit only during positive half cycles of the squarewave signal from oscillator 44. However, since the impedance of the current path to charge the capacitance CL2 is very low, the capacitance charges very rapidly. Since the impedance of the discharge path of capacitance CL2 as provided by a cathode ray tube is very high, very little discharging occurs during the negative half cycles of the squarewave signal when the transistors are biased to non-conduction. Thus, although there is some ripple in the output voltage EL (typically less than a fraction of a percent), the by-pass switch in a unit may be considered as closed when the alternating signal from the oscillator 44 is applied to a unit.

The switching generator as illustrated in FIG. 4 offers advantages in rapid switching to a higher output voltage less than the maximum voltage, for example, from 6 kilovolts to 8 kilovolts. If switch S13 is closed, the rate of charging the load capacitance CL2 is much greater than if switch S11 were closed. If the period during which switch S13 is closed is properly timed, it can be opened and switch S11 closed at the instant the voltage across capacitance CL2 reaches 8 kilovolts.

The apparatus of FIG. 4 also provides for rapidly reducing the voltage across the capacitance CL2, for example from 12 kilovolts (with swtich S13 closed) to 10 kilovolts (with switch S12 closed). Switch S13 is opened thus completely disconnecting the E1 voltage source 40 from point B. At the same instant switch S14 is closed thereby closing the by-pass switches in units 49, 50, and 51 and shorting point B to output terminal 43. Capacitance CL2 thus discharges rapidly through a very low impedance path. At the proper instant when capacitance CL2 has discharged to 10 kilovolts, switch S14 is opened and switch S12 is closed to maintain the 10 kilovolt voltage level at the output terminals.

Short circuiting of all the zener diodes in units 45, 46, and 47 when increasing the output voltage EL and of all the zener diodes in units 49, 50, and 51 when decreasing the output voltage, prevents high currents pulses from flowing through the diodes during voltage transitions. Thus, excessive heating of the diodes is avoided. Consequently, the frequency at which the output voltage EL may be changed is high.

During switching of the apparatus between different output voltages either the inductor L1 and resistor RA1 or the inductor L2 and resistor RA2 limit the peak current. This limiting protects the switching transistors T1 through TN of each unit preventing secondary breakdown due to high collector current pulses while the collector voltage is high. The parallel diodes CR1 and CR2 serve as inductor discharge paths to prevent the voltage between the inductor and its adjacent unit from exceeding the voltage at the respective terminal of the E1 supply voltage.

The high voltage switching generator of FIG. 4 may be employed to provide the accelerating anode voltages of 6, 8, 10, or 12 kilovolts for a beam penetration cathode ray tube. Suitable control logic in the display system operates in response to the incoming data to control the electronic equivalent of switches S11, S12, S13, and S14. As explained hereinabove the apparatus as described responds rapidly to effect the changes in voltage called for and may be operated to change voltages frequently.

One specific embodiment of the apparatus of FIG. 4 for supplying output voltages EL of 6, 8, 10, or 12 kilovolts employed E1 and E2 voltage sources of 6 kilovolts each. Each of the non-linear device and switch units employed a series of IN528IA zener diodes each having a threshold voltage ET of 200 volts. Thus, the threshold voltage ET of each unit was 2000 volts. The transistors T1 through TN were TR2754 NPN transistors, and the resistors R1 through RN were 820 ohms. Each transformer TR1 through TRN had a ferrite core number 266T125/3E2A made by Ferroxcube with a single primary turn of high voltage wire and 30 secondary turns of No. 28AWG enamel wire. The oscillators 44 and 48 produced squarewave output pulses of 5 volts at a frequency of 100 kilohertz. The load capacitance CL2 was 500 picofarads, the bleeder resistor RB2 was 18 megohms, the inductors L1 and L2 were 14 millihenries each, and resistors RA1 and RA2 were 4 kilohms each.

The apparatus produced a steady state output current of up to 1 milliampere, and the maximum ripple of the output voltage was 0.1 percent. The maximum time to swtich output voltages was 12 microseconds. The maximum frequency at which output voltages could be changed was 3 kilohertz, but this limitation was imposed by the particular voltage sources employed.

The apparatus as described can obviously be modified as desired for specific applications. For example, the threshold voltage of each unit in a series may be different by employing a different number of zener diodes and parallel transistor switching arrangements in each unit. Each of the units may be individually controlled by having separate connections to the oscillator rather than having the switch control terminals, oscillator, and switches connected as in FIG. 4.

Thus, apparatus for providing an available selection of a wide variety of output voltages can be obtained by combining a series of a number of units having a variety of different threshold voltages together with a control arrangement for selectively closing and opening the by-pass switches in each of the units.

While there has been shown and described what is considered a preferred embodiment of the present invention it will be obvious to those skilled in the art that various changes and modifications may be made therein without departing from the invention as defined by the appended claims.

What is claimed is:
1. Voltage switching apparatus including
a pair of input terminals;
a pair of output terminals;
a source of DC voltage connected between the input terminals;
load capacitance means connected between the output terminals;
a plurality of non-linear means connected in series between one of said input terminals and one of said output terminals, the current-voltage characteristic of each of said non-linear means having a threshold voltage below which conductance is low and above which conductance increases steeply;
a plurality of switch means, each connected in parallel with a different one of said plurality of non-linear means;
switch driving means for producing energizing pulses;
control means for selectively applying the energizing pulses from said switch driving means to the switch means of said plurality;
each switch means being operable when energizing pulses from said switch driving means are applied thereto to short-circuit the non-linear means in parallel therewith whereby the voltage across said load capacitance means is increased by an amount equal to the threshold voltage of the non-linear means in parallel with a short circuit and said switch means being operable in the absence of energizing pulses from said switch driving means to provide an open circuit across the non-linear means in parallel therewith whereby the voltage across said load capacitance means is decreased by an amount equal to the threshold voltage of the non-linear means in parallel with an open circuit;
additional non-linear means coupled between said one of said output terminals and the other of said output terminals, the threshold voltage of said additional non-linear means being greater than the total of the threshold voltages of said plurality of non-linear means;
additional switch means connected in parallel with said additional non-linear means; and
additional switch driving means for selectively applying an energizing signal to said additional means;
said additional switch means being operable in the absence of an energizing signal from said additional switch driving means to provide an open circuit across said additional non-linear means, and said additional switch means being operable in response to an energizing signal from said additional switch driving means to short-circuit said additional non-linear means whereby the voltage across said load capacitance means is rapidly reduced.

2. Voltage switching apparatus in accordance with claim 1 wherein
each of said switch means of said plurality includes transistor means connected across the associated non-linear means and coupled to said switch driving means, each of said transistor means being normally biased to nonconduction and being biased to conduction by energizing pulses from said switch driving means; and
said additional switch means includes transistor means connected across the additional non-linear means and coupled to said additional switch driving means, the transistor means being normally biased to nonconduction and being biased to conduction by pulses from said additional switch driving means.

3. Voltage switching apparatus in accordance with claim 2 wherein
each non-linear means including said additional non-linear means includes a plurality of zener diodes connected in series whereby the threshold voltage of each non-linear means equals the total of the threshold voltages of the plurality of zener diodes includes therein.

4. Voltage switching apparatus in accordance with claim 3 wherein
said transistor means of each of said switch means includes
a plurality of transistors connected in series with the emitter of each transistor connected to the collector of the next transistor in the series, each transistor being connected in parallel with zener diodes of the plurality of zener diodes connected between its collector and emitter; and
biasing means coupled between the base and emitter of each of said transistors and to the switch driving means, each biasing means being operable normally to bias the associated transistor to nonconduction, and being operable to bias the associated transistor to conduction in response to energizing pulses from the switch driving means; and said transistor means of each of said additional switch means includes
- a plurality of transistors connected in series with the emitter of each transistor connected to the collector of the next transistor in the series, each transistor being connected in parallel with zener diodes of the plurality of zener diodes connected between its collector and emitter; and
- biasing means coupled between the base and emitter of each of said transistors and to the additional switch driving means, each biasing means being operable normally to bias the associated transistor to nonconduction, and being operable to bias the associated transistor to conduction in response to energizing pulses from the additional switch means.

5. Voltage switching apparatus in accordance with claim 4 wherein
- each of said biasing means includes a transformer having a secondary winding connected between the base and emitter of the associated transistor and having a primary winding;
- the windings of the biasing means associated with each plurality of transistors being connected in series.

6. Voltage switching apparatus in accordance with claim 1 including
- first inductive means connected in series with said plurality of non-linear means between said one of said input terminals and said one of said output terminals for limiting current flow during switching of a switch means from providing an open circuit to providing a short circuit across the associated non-linear means; and
- second inductive means connected in series with said additional non-linear means between said one of said output terminals and said other of said output terminals for limiting current flow during switching of the additional switch means from providing an open circuit to providing a short circuit across the additional non-linear means.

7. Voltage switching apparatus in accordance with claim 6 including
- an intermediate terminal;
- said plurality of non-linear means being connected in series between said one of said input terminals and said intermediate terminal; and
- a second source of DC voltage connected between said intermediate terminal and said one of said output terminals whereby the voltage across said load capacitance means is equal to the voltage of the second source of DC voltage plus the voltage of the first-mentioned source of DC voltage minus the threshold voltages of non-linear means of the plurality in parallel with associated switching means providing an open circuit.

* * * * *